(12) United States Patent
Stinson

(10) Patent No.: US 7,143,773 B2
(45) Date of Patent: Dec. 5, 2006

(54) INTERMITTENT PRESSURE MODULE FOR A VACUUM REGULATOR

(75) Inventor: David Stinson, Richmond Hill (CA)

(73) Assignee: Amvex Corporation, Richmond Hill (CA)

( * ) Notice: Subject to any disclaimer, the term of this patent is extended or adjusted under 35 U.S.C. 154(b) by 440 days.

(21) Appl. No.: 10/716,022

(22) Filed: Nov. 18, 2003

(65) Prior Publication Data
US 2005/0103388 A1 May 19, 2005

(51) Int. Cl.
*G05D 16/00* (2006.01)

(52) U.S. Cl. ............... 137/1; 137/624.13; 137/624.15; 137/907

(58) Field of Classification Search ........... 137/624.13, 137/624.15, 907, 1
See application file for complete search history.

(56) References Cited

U.S. PATENT DOCUMENTS

| | | | |
|---|---|---|---|
| 2,573,927 A | * | 11/1951 | Orelind ................. 137/624.13 |
| 4,391,294 A | * | 7/1983 | Aubel .................... 137/493.8 |
| 4,782,849 A | | 11/1988 | Hodge |
| 4,830,047 A | | 5/1989 | Hodge |
| 4,915,132 A | | 4/1990 | Hodge et al. |
| 5,265,638 A | | 11/1993 | Fischer et al. |
| 5,265,639 A | | 11/1993 | Tobia et al. |
| 5,353,838 A | * | 10/1994 | Grant ................... 137/624.13 |
| 5,599,308 A | | 2/1997 | Krupa |
| 6,228,056 B1 | | 5/2001 | Boehringer et al. |

OTHER PUBLICATIONS

Boehringer Laboratories, Inc. "Boehringer Suction Regulators". 1992, pp. 1-16.

* cited by examiner

Primary Examiner—Kevin Lee
(74) Attorney, Agent, or Firm—Ohlandt, Greeley, Ruggiero & Perle, L.L.P.

(57) ABSTRACT

An intermittent pressure module for controlling the position of a valve between two positions comprising diaphragm means; a plurality of ports associated with said diaphragm means for exposing said diaphragm means to a selected pressure in said first position, and ambient pressure in said second position; swing means associated with said diaphragm means and said valve means for intermittently displacing said valve means when said diaphragm means is exposed to said selected pressure in said first position and ambient pressure in said second position.

20 Claims, 11 Drawing Sheets

INTERMITTENT PRESSURE MODULE FOR A VACUUM REGULATOR

FIELD OF INVENTION

This invention relates to an intermittent pressure module for controlling the position of a valve between two positions, and particularly relates to a vacuum regulator having a removably securable, intermittent vacuum module for producing intermittent regulated vacuum flow. The invention also relates to a method of producing an intermittent vacuum by moving a valve to a first position to couple a supply of vacuum to a diaphragm chamber and a second position for evacuating the vacuum in the diaphragm chamber.

BACKGROUND OF THE INVENTION

A variety of devices have heretofore been produced and utilised in order to deliver an intermittent pressure. Such pressure can be positive in the sense of being greater than ambient pressure or negative when dealing with a vacuum.

In one such application, the aspiration of fluids from a patient is accomplished by providing a vacuum source to the internal body area of the patient requiring aspiration. Typically, unregulated hospital vacuum line pressure is approximately between 19 to 25 inches of mercury Hg.

The use of vacuum regulators as medical devices is well known to achieve such aspiration of fluids.

Generally speaking, such vacuum regulators are attached to a vacuum outlet in the wall of the patient's hospital room and known vacuum regulators are utilised in order to select the desired level of vacuum.

Furthermore, some of the vacuum regulators also include an intermittent vacuum regulator with a timing module in order to apply intermittent vacuum to a patient followed by exposure to an ambient pressure. For example, the U.S. Pat. No. 5,599,308 teaches an intermittent vacuum regulator having a timing module in combination with a valve for controlling the position of the valve between two or more states.

Moreover, U.S. Pat. No. 6,228,056 B1 illustrates an intermittent regulator in which the regulator alternates between supplying partial vacuum to a patient for withdrawing fluids from the body of a patient, and supplying atmosphere to a patient, at a selected intermittent rate, that is adjustable upon adjusting a timing mechanism.

Moreover, U.S. Pat. Nos. 4,782,849 and 4,830,047 each illustrate a controlled unit for an intermittent suction system.

Furthermore, U.S. Pat. No. 5,265,638 shows an intermittent suction device for removing fluids from a patient where the duty cycle between the off and on cycle is controlled by a magnetically susceptible diaphragm that switches back and forth between a first and second position.

Furthermore, U.S. Pat. No. 5,265,639 shows a magneto-pneumatic timing device that provides a pressure signal alternating between a high and low pressure output signal.

It is an object of this invention to provide an improved intermittent pressure module. It is further object of this invention to provide a vacuum regulator having an intermittent vacuum module, which is removable and securable thereto. It is a further object of this invention to provide an improved method for producing an intermittent pressure. It is a further object of this invention to provide a regulator that may be convertible from a regulated substantially constant pressure flow to an intermittent pressure flow.

It is an aspect of this invention to provide an intermittent pressure module for controlling the position of a valve between two positions comprising a diaphragm; a plurality of ports associated with said diaphragm for exposing the diaphragm to a selected supply pressure in a first position and another pressure in a second position; and swing arm structure associated with the diaphragm and the valve for intermittently displacing the valve when the diaphragm is exposed to the selected supply pressure in the first position and said other pressure in the said second position.

It is another aspect of this invention to provide a vacuum regulator having: an intermittent channel for vacuum flow; a regulated channel for regulating a level of vacuum; an intermittent vacuum module removably securable to the vacuum regulator, the intermittent vacuum module presenting an intermittent port for communicating with the intermittent vacuum channel, a regulated port for communicating with said regulator channel, a diaphragm assembly displaceable within a diaphragm chamber having a diaphragm port, and a valve for intermittently connecting the intermittent port with the diaphragm port so as to expose the diaphragm assembly to a vacuum in a first position, and for connecting the intermittent port to the regulator port to relieve the vacuum from said diaphragm chamber (i.e. inflate the diaphragm chamber) to ambient pressure in a second position, and swing arm associated with a diaphragm assembly and the valve for intermittently displacing the valve when said diaphragm is exposed to the vacuum in the first position and ambient pressure in the second position.

It is another aspect of this invention to provide a method of producing an intermittent vacuum by moving a valve to a first position to couple a supply of vacuum to a diaphragm chamber having a diaphragm move in response to the vacuum for moving a spring loaded swing arm so as to move the valve to a second position to couple the supply of vacuum to a regulated port and relieve the vacuum from the diaphragm chamber (i.e. inflate the diaphragm chamber) and move the diaphragm in response to said relief for moving said spring loaded swing arm so as to move the valve to the first position, repeatedly.

These and other objects and features of the invention shall now be described in relation to the following drawings:

DESCRIPTION OF THE PREFERRED EMBODIMENT

In the description that follows, like parts are marked throughout the specification and the drawings with the same respective numbers. The drawings are not necessarily to scale and in some instances proportions have been exaggerated in order to more clearly depict certain features of the invention.

Furthermore the invention to be described herein is applicable to regulate and deliver an intermittent pressure which may be positive or negative relative ambient atmospheric pressure. Therefore although one preferred embodiment is described in relation to a vacuum (i.e. negative pressure) the invention embraces positive pressure intermittent flow as well. Although the invention is described in relation to air it is applicable to other gases and fluids.

Figure 2:
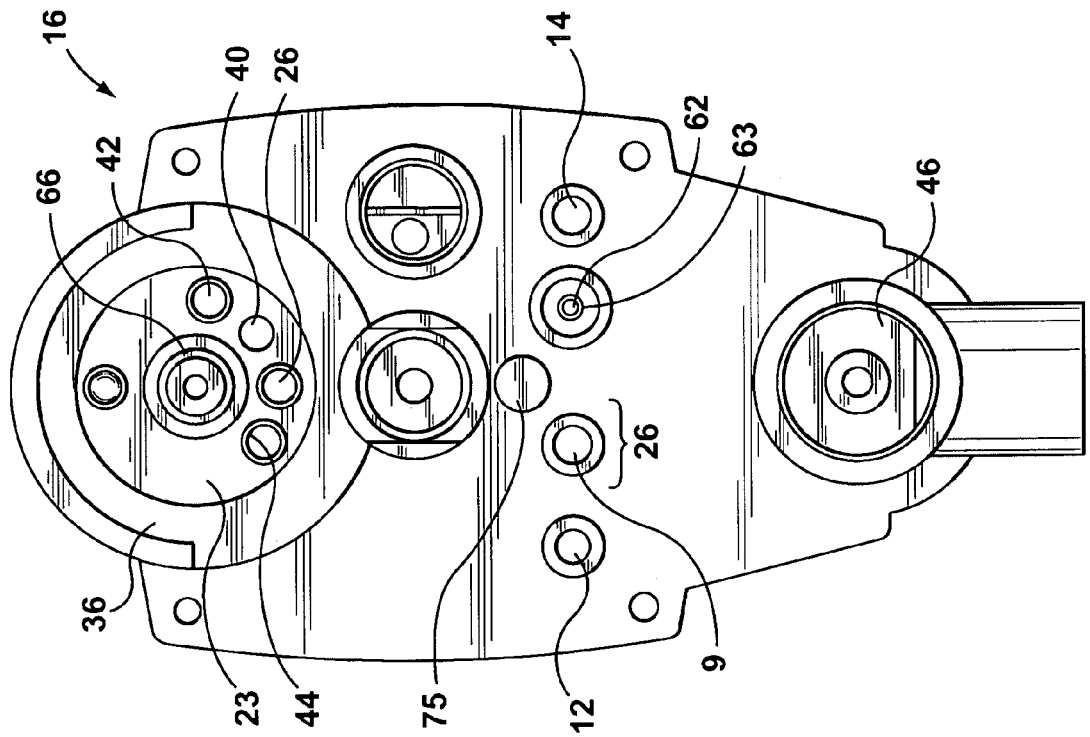
FIG. 2 is the front view of the vacuum regulator.
Figure 1:
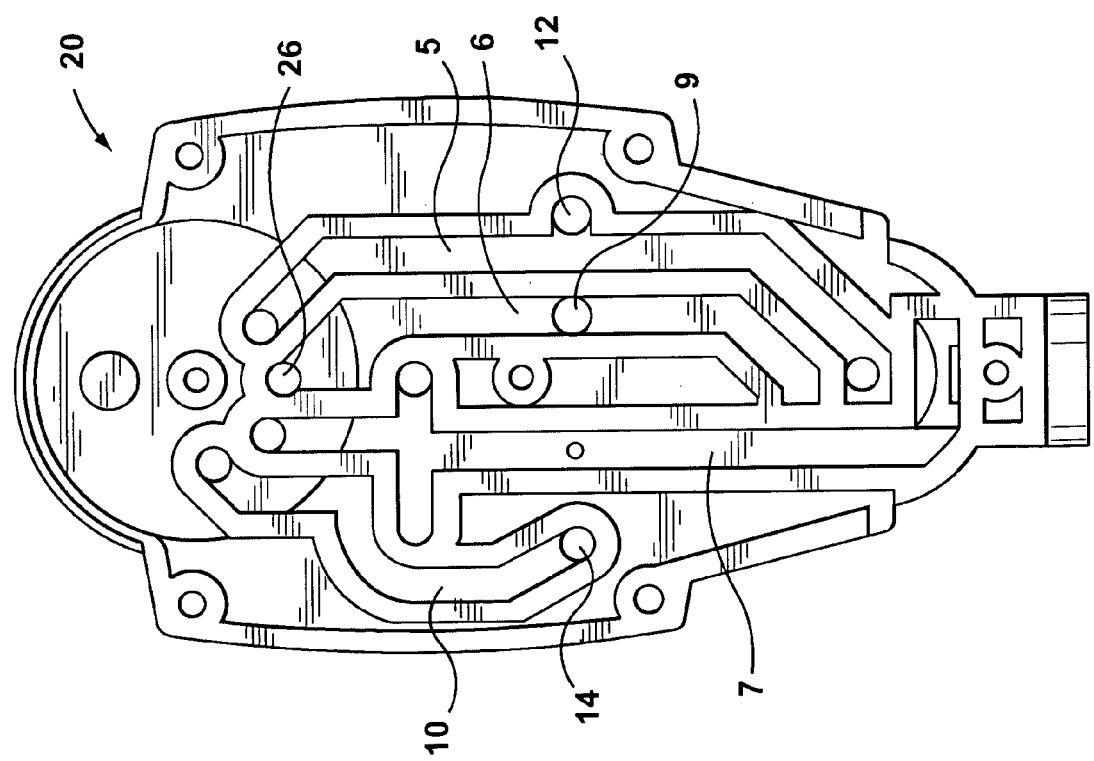
FIG. 1 is a top plan view of the back face of FIG. 1.

FIG. 1 represents the back inner surface of the front body 18 while FIG. 2 represents the front outer surface of the front body 18. The invention described herein utilizes four channels namely regulator channel 5, vacuum channel 6, output channel 7, and intermittent channel 10 as shown in FIG. 1. Furthermore the front surface of front body presents four ports, namely a pressure relief port 9, bleed port 62, regulator channel port 12 and intermittent channel port 14.

Typically prior art regulators utilise a three channel two port design. The three channels that prior art devices exhibit are the vacuum channel 6, regulator channel 5 and output channel 7. The two ports that prior art devices exhibit are the pressure relief port 9 and bleed port 62. The pressure relief port 9 is typically covered by a duckbill 26 which embraces the circular flange 63 in a manner well known to persons skilled in the art. Pressure relief port 9 communicates with vacuum channel 6, and if a selected positive pressure is experienced in vacuum channel 6 the duckbill 26 flexes from relief port 9 to permit pressure to vent to atmosphere rather than into the patient. Bleed port 62 communicates with output channel 7 and is utilised to properly regulate the unit in a manner well known to those persons skilled in the art and may comprise an orifice for example 13 thousandths of an inch in diameter that sucks in air or depressurizes when the system is off.

In the drawings the intermittent channel port 14 communicates with intermittent channel 10, pressure relief port 9 communicates with vacuum channel 6, bleed port 62 communicates with output channel 7 and intermittent channel port 14 communicates with intermittent channel 10, and regulator channel port 12 communicates with regulator channel 5.

Figure 3:
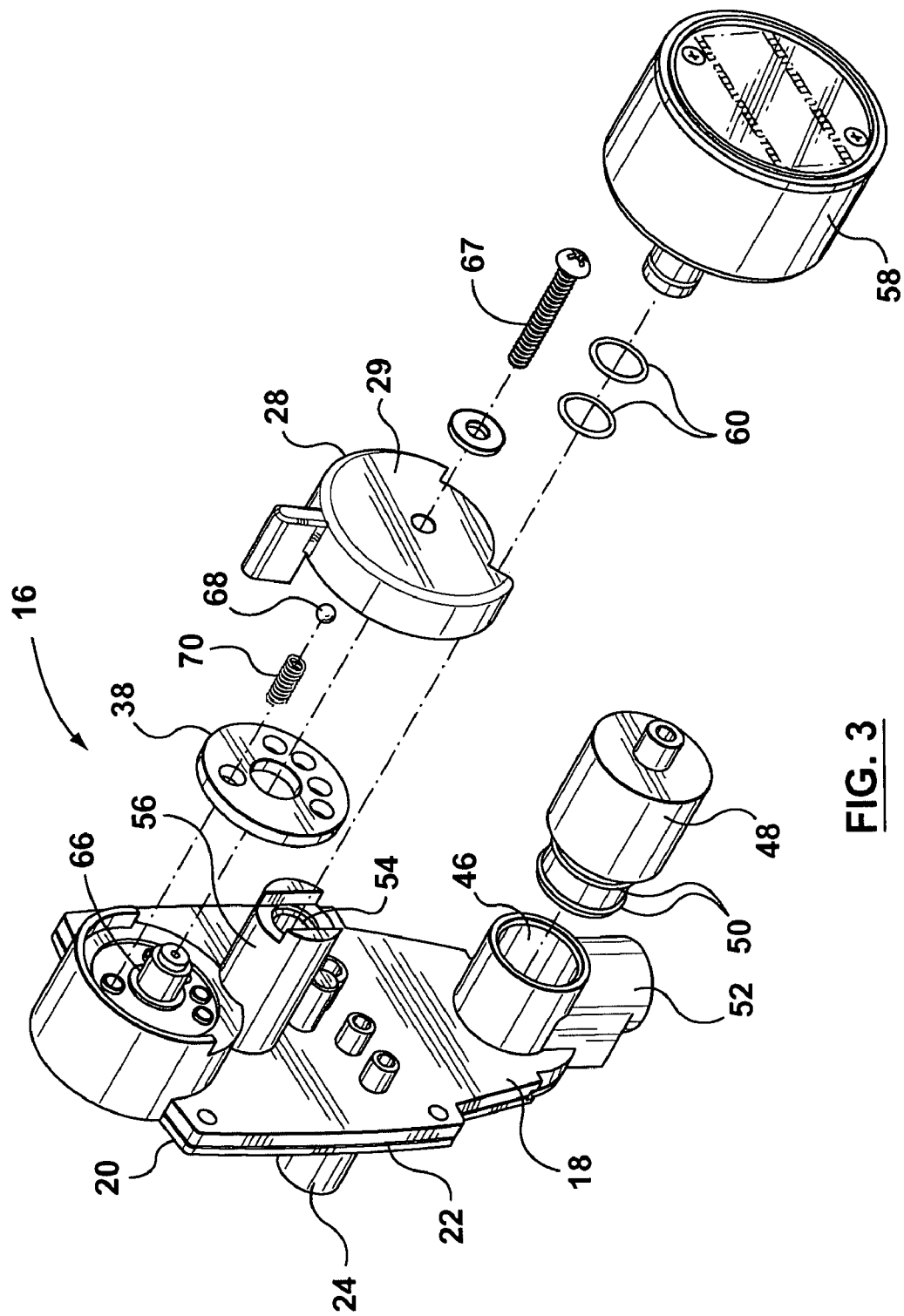
FIG. 3 is a partial exploded view of the vacuum regulator.

FIG. 3 illustrates generally the various components of the vacuum regulator 16 as illustrated in FIGS. 1 and 2. Generally speaking the vacuum regulator 16 includes a front body 18. The backside of the front body 18 contains the channels or passageways 5, 6, 7 and 10 previously described. The front body 18 registers with a back body 20 and is fastened thereto by means of screws or the like in a conventional manner. A gasket 22 having the general profile of the channels and holes is provided between the front face 18 and the back body 20. The rear surface of the back body 20 includes a vacuum inlet 24 which is secured to a common vacuum source in a hospital or the like.

Accordingly, vacuum pressure is introduced through inlet 24 which communicates with the vacuum channel 6 and communicates with vacuum selector port 26; and pressure relief port 9 communicates with the vacuum channel 6 but is typically covered by a duck bill port cover 26 as shown in FIG. 2. More particularly, the duck bill port cover 26 is utilized as a safety feature in the event that a positive pressure is accidentally introduced into the output channel thereby opening the duck bill port cover 26 to permit venting of the pressure to atmosphere, and preventing positive pressure from being introduced to patient.

Figure 4:
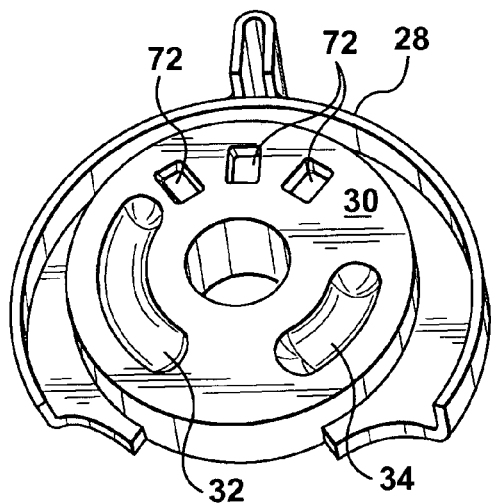
FIG. 4 is the rear face of the selector dial.
Figure 5:
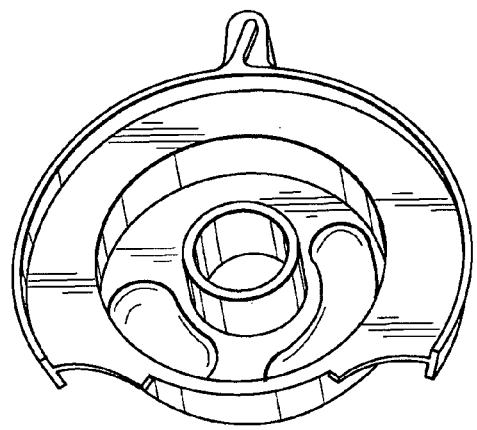
FIG. 5 is the front face of the selector dial.
Figure 6:
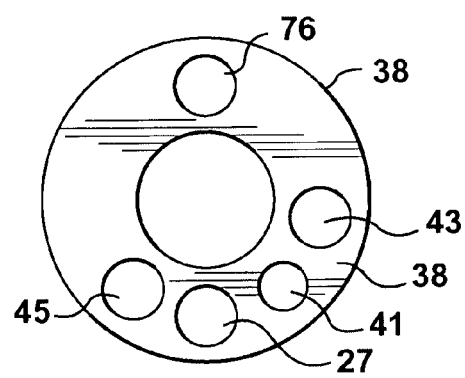
FIG. 6 is a top plan view of a full-mode selector gasket.

A selector dial 28 is utilised to select the vacuum regulator 16 in the "off "mode, "full" vacuum flow mode, or "regulated" mode as show in FIG. 3, 4 and 5. More specifically the selector dial 28 has an inner operating face 30 with a pair of kidney-shaped recesses 32 and 34, which selectively allow the communication of vacuum between the vacuum selector port 26 and the regulator channel 5. More specifically, a gasket shown in FIG. 6 is sandwiched between face 30 of selector dial 28 and selector face 36 as shown in FIG. 2. The selector face 36 includes the vacuum selector port 26 which communicates with hole 27 of gasket 38, a full output selector port 40 which communicates with hole 41 of gasket 38, intermittent selector port 42 which communicates with intermittent hole 43 of gasket 38, and regulator selector port 44 which communicates with hole 45 of gasket 38.

Accordingly, when the selector dial 28 is manipulated so that recess 34 couples the vacuum selector port 26 with the regulated port 44 input vacuum from the vacuum channel 6 is directed to the regulated channel 5 which communicates with the regulator well 46 in a manner well known to those skilled in the art. The regulator well 46 receives a regulator assembly 48 and is sealed thereto by O rings 50. The regulator 48 permits selection of a desired level of pressure namely vacuum pressure to be delivered through the patient output port 52 in a manner well known to those persons skilled in the art.

Furthermore if the selector dial 28 is manipulated so that recess 32 couples vacuum selector port 26 with hole outlet selector port 40 full vacuum pressure communicates between the vacuum channel 6 and output channel 7 delivering a full vacuum to the patient outlet 52. The selector plate may also be manipulated in an off position.

The output channel 7 includes an aperture 54 which communicates with a projecting hollow flange 56 for receiving a gauge assembly 58 for displaying the level of vacuum. The gauge assembly 58 can comprise of a rotary dial or digital gauge. O rings 60 provide the necessary sealing of the gauge assembly 58 within the hollow flange.

A bleed outlet 62 is included in the output channel 7 and is sized to provide optimal vacuum operation in a manner well known to those persons skilled in the art.

The vacuum regulator 16 is dimensioned so as to permit retro fitting into a standard three channel vacuum regulator with the four channel vacuum regulator having intermittent capability to be described herein. In other words a standard prior art three channel two port regulator may be removed from its housing (not shown) and the four channel four port regulator 16 described herein substituted in its place.

Figure 7:
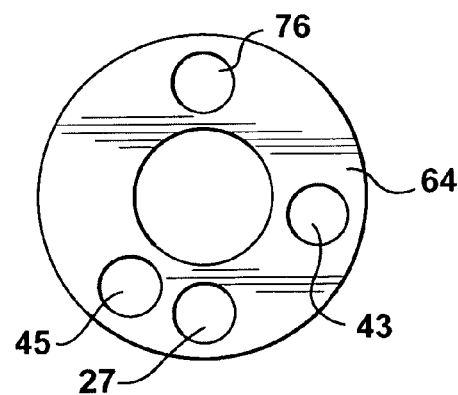
FIG. 7 is a top plan view of an intermittent mode selector gasket.

When utilising the intermittent mode, of the vacuum regulator 16 the full mode selector gasket 38 described in FIG. 6 is replaced by the intermittent mode gasket 64 illustrated in FIG. 7. The intermittent mode selector gasket 64 shown in FIG. 7 is similar to the gasket 38 shown at FIG. 6 except that the selector output port 40 of gasket 38 has been blocked so as to disable the full vacuum output channel. Moreover, the selector dial as shown in FIG. 4 is utilised whereby the kidney shaped recess 32 is longer than the kidney shaped recess 34 so as to permit the vacuum source from the vacuum selector port 26 to communicate with the intermittent selector port 42.

The face 30 of selector dial 28 gasket and selector face 36 are dimensioned so as to provide a sealed fit there between with substantially no pressure leakage.

The selector dial 28 is received by post 66 and is secured thereto by fastening means such as a screw 67 or the like. The selector face 36 includes a small ball 68 that is positioned on the free end of a spring 70 and adapted to engage with detents 72 to secure the selector dial 28 in the three positions namely intermittent, off, and regulated flow.

Each of the gaskets 38 and 64 include a hole 76 which is adapted to receive the ball 68.

When utilising the vacuum regulator 16 in an intermittent mode module 80 is added to the regulator 16. The intermittent module 80 comprises a cover plate 82 intermediate section 84 and base section 86.

In order to upgrade the vacuum regulator to permit intermittent pressure flow, the intermittent module 80 must be attached and the vacuum regulator selector gasket 38 replaced with the intermittent mode selector gasket 64 so as to convert the "full" mode position of a selector to a "intermittent" mode. Moreover the indicia 29 on the face plate of the selector 28 will be changed to indicate "Off" "Intermittent" and "Regulated" pressure modes. The gasket 68 accomplishes this by blocking the output selector port 40 and allowing access to the intermittent channel 10.

Figure 23:
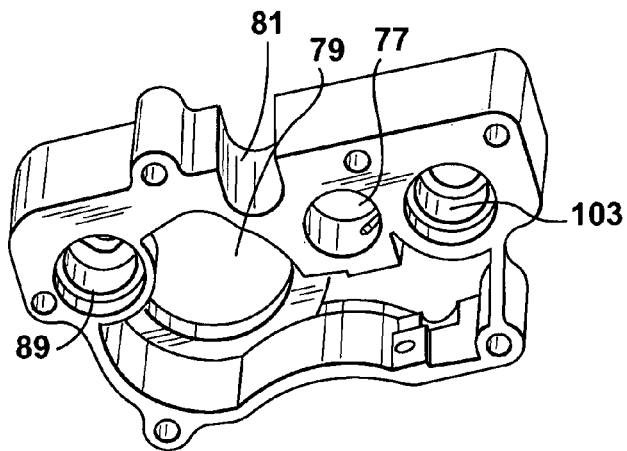
FIG. 23 illustrates a perspective bottom view of the module base

The intermittent module 80 slides on and seals against the intermittent channel port 14 and regulator channel port 12. The intermittent module 80 includes module intermittent port 89 and module regulator port 103 located on the base 86 as best seen in FIG. 23 which communicate and seal with the intermittent port 14 and regulator port 12 referred to above. Furthermore recess 77 accommodates the insertion of pressure relief port 9 while recess 79 accommodates the insertion of flange 63. "U-shaped cut out 81 registers with and is located by locating post 75 so as to securely receive the intermittent module 80.

The intermittent port 14 permits access to the vacuum supplied to the vacuum regulator 16 only when the, regulator is in the intermittent mode as previously described. The regulator port 12 allows access to the regulator 48 as previously described. The module intermittent port 89 communicates with passage 88 extending through base 86 and passage 92 extending through intermediate portion 84 while module regulator port 103 communicates with passage 107 extending through base 86 and intermediate portion 84.

When the vacuum regulator 16 is in the "intermittent" mode the intermittent module 80 is continuously supplied with a vacuum from vacuum channel 6 through vacuum selector port 26 coupled by recess 32 to intermittent selector port 42 through intermittent channel 10 to the intermittent port 14 which communicates with the module intermittent port 89 and passage 88. Passage 88 in turn communicates with passageway 92 through intermittent portion 84. The other end of passage 92 communicates with intermittent valve port 101 of the intermittent module 80. Moreover passage 107 communicates with module regulator port 103.

The intermittent module 80 controls the intermittent delivery of vacuum pressure to a patient in a selected ratio such as for example 2:1 timing ratio. In other words the 2:1 ratio represents the vacuum being on twice as long as the vacuum being off. Other ratios can however be selected.

The intermittent module 80 comprises an intermittent port selector valve 104, deflate timing needle valve 106, diaphragm assembly 108 and spring loaded swing arm 110.

Figure 12:
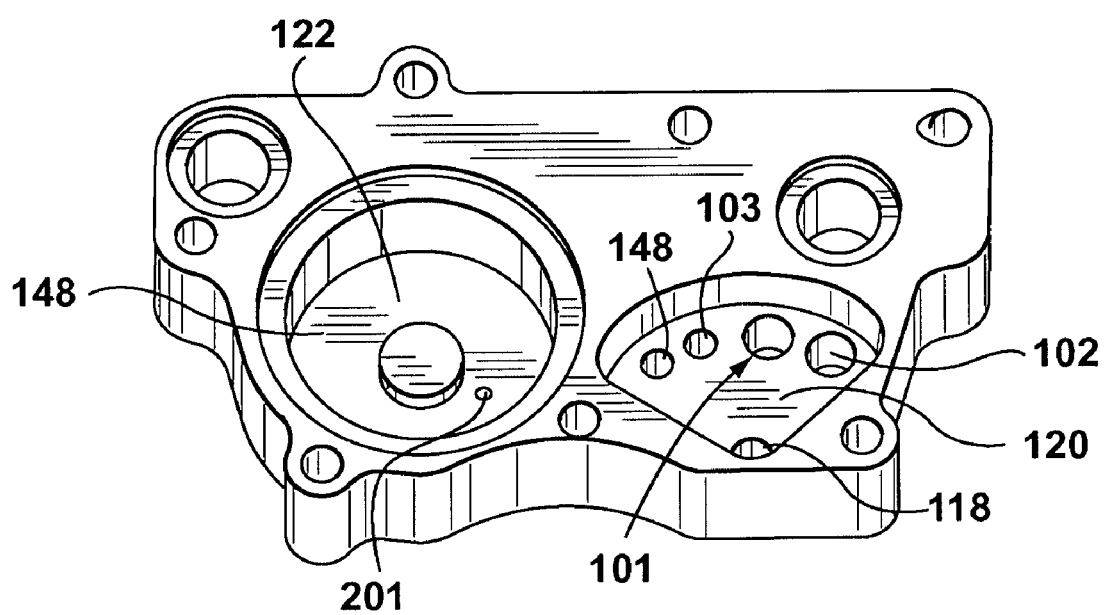
FIG. 12 is a view of the lower face of intermittent intermediate portion of the intermittent module showing the diaphragm chamber.
Figure 13:
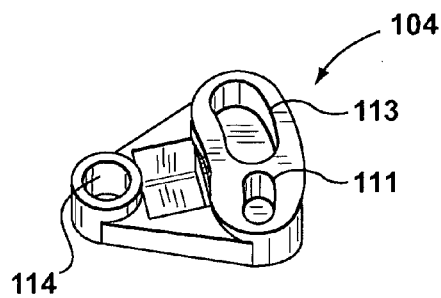
FIG. 13 is a perspective view of the intermittent port selector valve.
Figure 14:
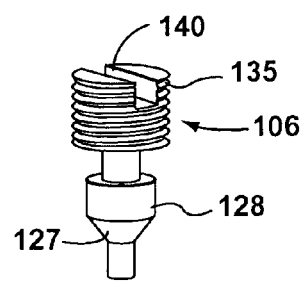
FIG. 14 is a perspective view of a needle valve.
Figure 15:
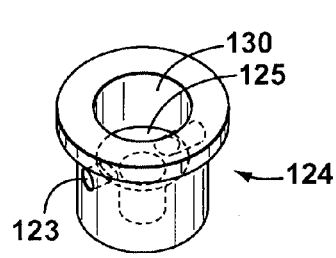
FIG. 15 is a perspective view of a needle body.

The intermittent port selector valve shown in FIG. 13 is utilised to connect two port holes together. In particular, the intermittent port selector valve 104 is retained in port select valve recess 112 disposed in intermediate section 84 shown in FIGS. 12 and 21. The port selector valve recess 112 includes the intermittent module port 101, intermittent regulator port 102, diaphragm port 103 and exhaust port 148. Depending on the position of the port selector valve 104 it will connect the intermittent module port 101 to the regulator module port 102 or the intermittent port 101 to the diaphragm port 103.

Figure 21:
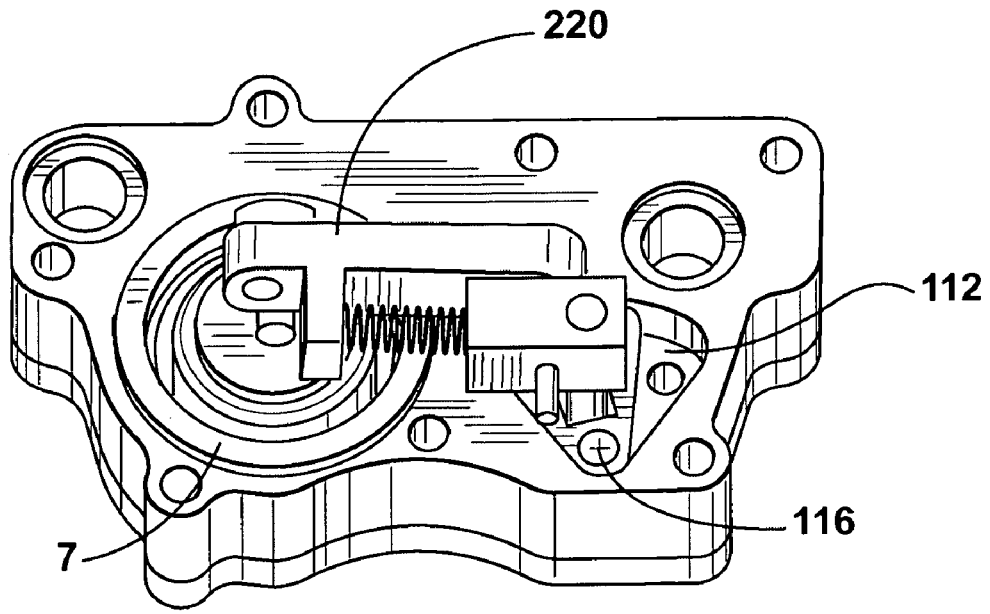
FIG. 21 is a perspective view of the timing module.

The port selector valve 104 is generally triangular in shape with oval cups 111 and 113 at its larger end used to connect two ports. Oval cup 113 is larger than 111. Furthermore the port selector valve 104 includes aperture 114 which is adapted to receive a pin 116 for pivotal movement about pin receiving hole 118 as shown at FIGS. 12 and 21. An air-tight seal is made between the valve 104 and the surface 120 surrounding the ports 101, 102, 103 and 148 by utilising highly planar surfaces.

When the intermittent port selector valve 104 is moved so that cup 113 couples or connects the intermittent module port 101 to the diaphragm port 103 the module regulator port 102 is left open to atmosphere and there is no vacuum delivered to the patient. Furthermore exhaust 148 is disposed under cup 112. In this position, the air in the diaphragm chamber 122 is evacuated at a rate depending on the deflate timing needle valve 106 since the diaphragm port 103 is connected to the diaphragm chamber 122 by means of needle passage 200 and port 201.

The deflate timing needle valve 106 is disposed in passage 200. Deflate timing needle valve 106 comprises of a needle valve portion 128 having angled portion 127 which is received in needle body 124, having an angled seat portion 125. Both deflate timing needle valve 106 and needle body 124 are received by receiving hole 126 shown in FIG. 10. The deflate timing needle valve 124 includes the needle portion 128 which is received within the hole 130 of needle body 124. The other end of the deflate timing needle valve 106 includes a threaded end 135 which is threadedly received within a threaded hole 134 presented by the intermittent cover plate 82. The deflate timing needle valve 106 includes a tool-receiving head 140 which permits rotation of the needle. The needle body includes a hole 123 there through which intersects valve seat 125 twice, and which is adapted to be aligned with needle passage 200 which has one end 201 communicating with diaphragm chamber 122 and another end which communicates with diaphragm port 103.

Depending on the tightening of the needle the size of the orifice between the diaphragm chamber 122 and the exhaust passage 200 (by means of hole 123) is either increased or decreased to increase or decrease the time duration of the evacuation or introduction of air out of or into the diaphragm chamber. As the needle valve is tightened so that the space between the angled surface 127 and seat 125 is made smaller the time duration increases, while the time duration is lessened by increasing the space. During the time the vacuum is introduced or diverted into the chamber the patient gets no vacuum. Thus the deflate timing needle valve 106 controls the time that the patient does not get vacuum.

Figure 8:
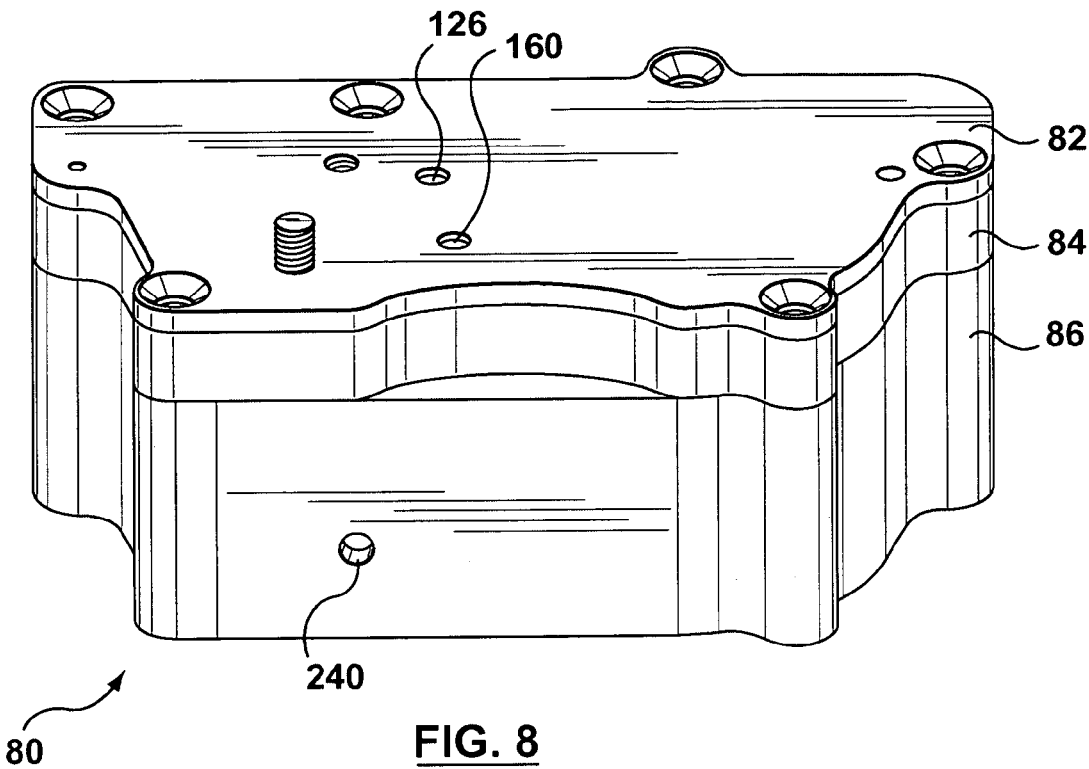
FIG. 8 is a perspective of an assembled intermittent module.
Figure 9:
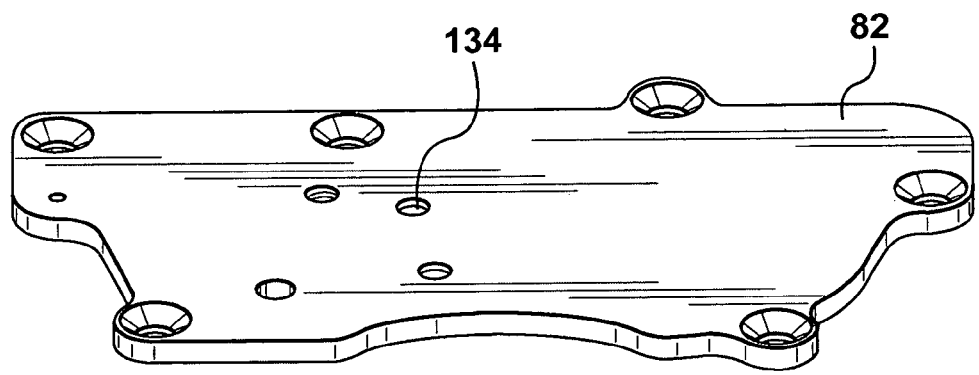
FIG. 9 is a top cover plate shown in FIG. 8.
Figure 10:
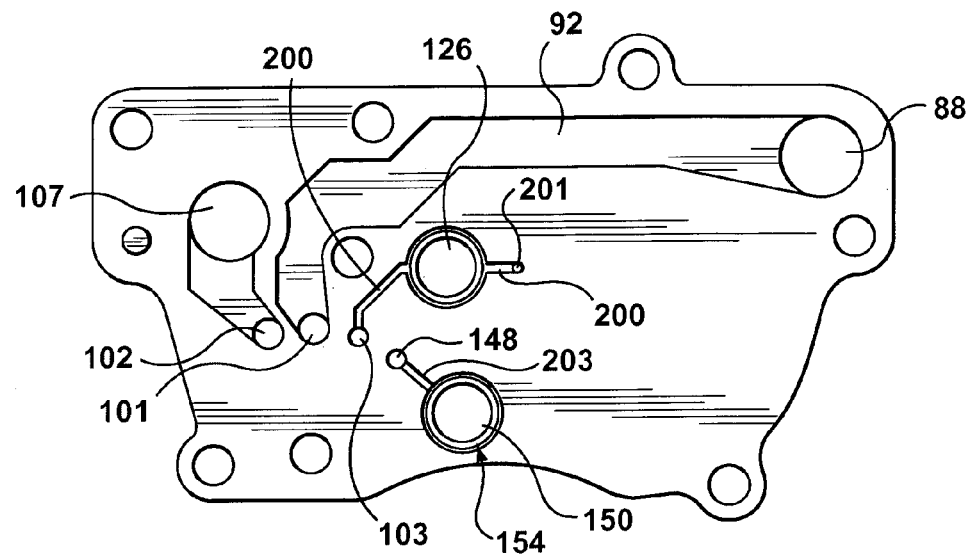
FIG. 10 is the upper face of intermediate intermittent vacuum section shown in FIG. 8 (i.e. the face that contacts the top cover plate).
Figure 11:
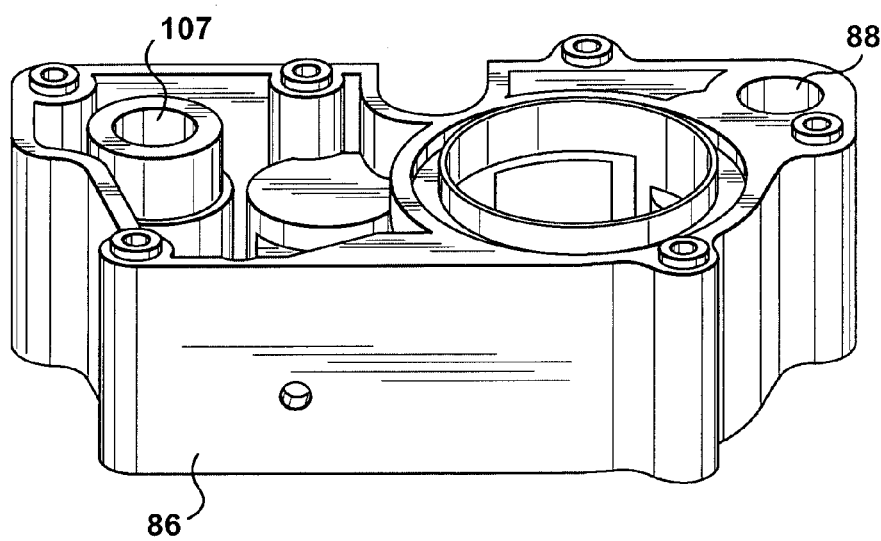
FIG. 11 is the upper face of intermittent base portion that contacts the face shown in FIG. 12.
Figure 16:
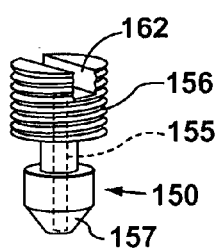
FIG. 16 illustrates an exhaust needle.
Figure 17:
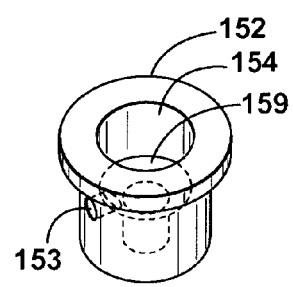
FIG. 17 illustrates an exhaust needle body.
Figure 18:
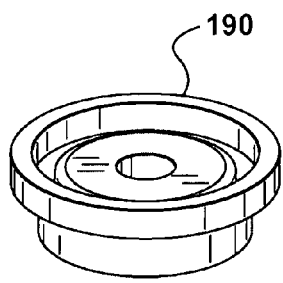
FIG. 18 illustrates a rolling diaphragm.
Figure 19:
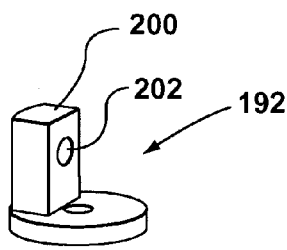
FIG. 19 is a perspective view of the upper support plate.
Figure 20:
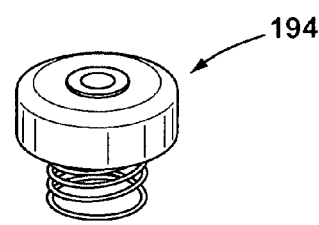
FIG. 20 is a perspective view of the lower support plate.

The valve recess 112 also includes an exhaust port 148 which communicates with an inflate timing needle valve 150. The inflate timing needle valve registers with exhaust body 152 retained by exhaust body hole 154 as shown in FIGS. 8, 9 and 10. The inflate timing needle valve 150 includes an angled portion 157, a threaded end 156 which is slotted at 162 so as to permit threaded engagement with a threaded hole 160 located on a intermittent cover shown at FIGS. 8 and 9. The inflate timing needle valve 150 has a hole 155 disposed axially through the inflate timing needle valve 150 from the slotted end 162 to the other end as shown. The exhaust body 152 includes a valve seat 159 and a hole 153 which intersects the valve seat 159 once (ie half way) The hole 155 exhausts to atmosphere by means of passage 203. Passage 203 communicates with the exhaust port 148 at one end and with hole 123 at the other end thereof. The slotted end 162 is adapted to be manipulated so as to select the time that the patient has vacuum. The smaller the effective space between the valve 157 in FIG. 16 and the valve seat 159 in FIG. 17 the more vacuum time the patient will receive.

The diaphragm assembly comprises a rolling diaphragm 190, upper support plate 192, lower support plate 194 and spring 196. Diaphragm 190 is pressed between the upper and lower support plates 192 and 194 as shown. The diaphragm 190 seals the diaphragm chamber 122 which in turn is connected to the diaphragm port 103.

The spring 196 is disposed so as to contact the lower surface of the diaphragm chamber 122 and the lower support plate 194 as shown. The spring 196 exerts a force to push the diaphragm 190 away from the lower surface of the diaphragm chamber 122. The upper support plate 192 has a raised section 200 with a hole 202 for pivotal movement thereabout. The upper portion 200 is pivotally connected to a spring-loaded swing arm 110.

Figure 22:
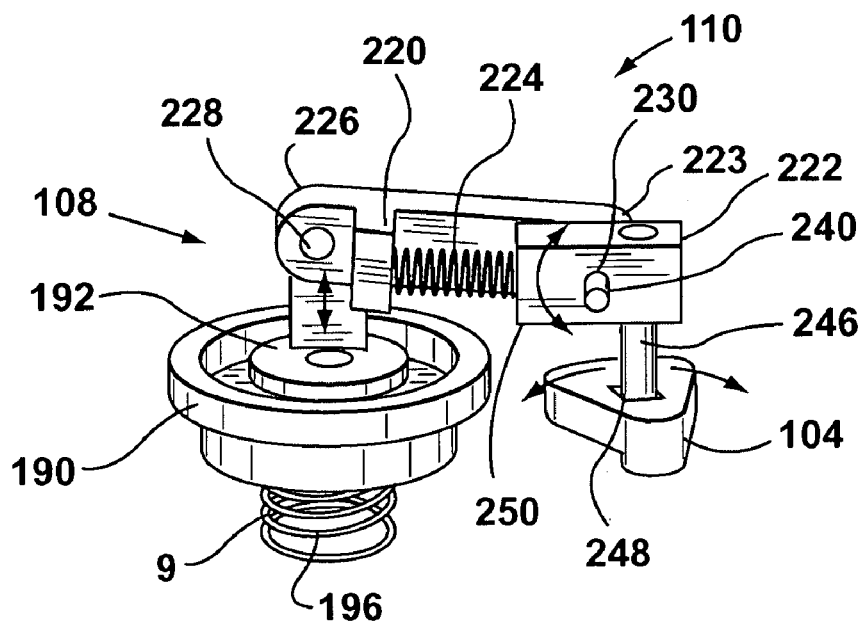
FIG. 22 is a partial side perspective view of the spring-loaded swing arm.

When the diaphragm port 103 is connected to the vacuum supply through the intermittent port 101 by means of the port select valve 104 the vacuum will evacuate the air within the diaphragm chamber 122 causing a strong compression force against spring 196 (during this time as mentioned above the intermittent regulator port is left open to atmosphere and no vacuum delivered to the patient). In the orientation shown in FIG. 22, the strong downward force from the vacuum will cause a strong downward force from the diaphragm 190 against the spring 196 resulting in a negative or downward displacement of the upper support plate 192.

When the port selector valve 104 is moved so cup 113 connects the module regulator port 102 and intermittent module port 101 vacuum is supplied to the patient. At the same time the diaphragm 103 is coupled to exhaust port 148 by means of cup 111 and thus the diaphragm is open to atmosphere (through both deflate timing needle valve 106 and inflate timing needle valve 150) which will return the diaphragm chamber 122 to atmosphere pressure. During this time vacuum is supplied to the patient through the intermittent regulator port, and regulator channel as described above. The return of the positive pressure will lessen the downward force on the diaphragm 190 onto the spring 196 allowing the spring 196 to decompress back to its original state resulting in a positive displacement of the upper support plate 192.

The spring loaded swing arm 110 acts as a timing or switching module for the intermittent port select valve 104 between two possible positions. The maximum and minimal vertical positions of the upper support plate 192 signals the spring-loaded swing arm 110 to switch between the two positions of the valve. The spring-loaded swing arm 110 comprises a cantilever arm 220, a swing arm 222, and a spring 224.

One end 226 of the cantilever arm 220 is connected to the hole 202 so as to provide a pivot point 228 to the upper end of the support plate 200. The other end 223 of the cantilever arm 220 is connected to a pivot point 230. In particular, end 223 of the cantilever arm 220 includes a hole and the swing arm 222 also includes a hole adapted to receive a pin 240 which is fixedly secured to a hole 240 (as shown in FIG. 8) namely the intermittent module casing.

One end of the swing arm 222 has a protruding stem 246 that runs through an appropriate hole 248 in the port selector valve 104. The other end 250 of the swing arm 122 is attached to a compressed spring 224 of which the other end of the compressed spring 224 is secured to the cantilever arm 220 close to the pivot point 228 with the upper support plate 192.

Generally speaking, the spring 224 is stable in three positions only, namely, 1. When the cantilever arm 220 and swing arm 222 are in a generally horizontal alignment with each other whereby generally speaking the force of the compressed spring travels through both pivot points 228 and 230; and
2. When the cantilever arm 220 is pulled downwardly by the upper support plate 192 (when referring to FIG. 22). In other words when the diaphragm chamber is exposed to a vacuum the upper support plate will travel downwardly and the vertical component of the spring 224 will cause the swing arm 222 to move quickly clockwise resulting in the quick switching of the intermittent port select valve 104 to connect intermittent ports 101 and 102. Vacuum will be delivered to the patient when valve 104 connects intermittent ports 101 and 102. At the same time the ports 103 and 148 are connected to inflate the diaphragm chamber 122.
3. When the cantilever arm 200 is pushed up by the upper support plate 192. This occurs when atmospheric pressure is exposed to the diaphragm chamber 122 so that the upper support plate 192 will travel upwards and the vertical component of the spring 222 will cause the swing arm to move quickly counter clockwise resulting in a quick switching of the intermittent port selector valve 104 to connect ports 101 and 103. Vacuum will be delivered to the diaphragm chamber and not the patient when valve 104 connects intermittent ports 101 and 103.

The intermittent pressure module 80 described above controls the position of the valve 104 between two positions and comprises the diaphragm assembly 108, a plurality of ports 101, 102, and 148 associated with the diaphragm assembly 108 for exposing the diaphragm assembly 108 between a selected pressure in the first position and an ambient pressure in the second position, and comprises a spring loaded swing arm associated with the diaphragm assembly 108 and the valve 104 for intermittently displacing the valve 104 when the diaphragm assembly 108 is exposed to the selected pressure in the first position and the ambient pressure in the second position.

The valve 104 couples the vacuum and the intermittent module port 101 with the diaphragm port 103 for communicating vacuum pressure with the diaphragm chamber 122 so as to draw the diaphragm assembly 108 to the first position. Moreover, the valve 104 couples the vacuum and the intermittent module port 101 with the module regulator port 102 to deliver vacuum to the patient and port 148 and port 103 is connected to inflate or relieve the vacuum from the diaphragm chamber 122 and move the diaphragm assembly 108 to a second position.

Figure 24A:
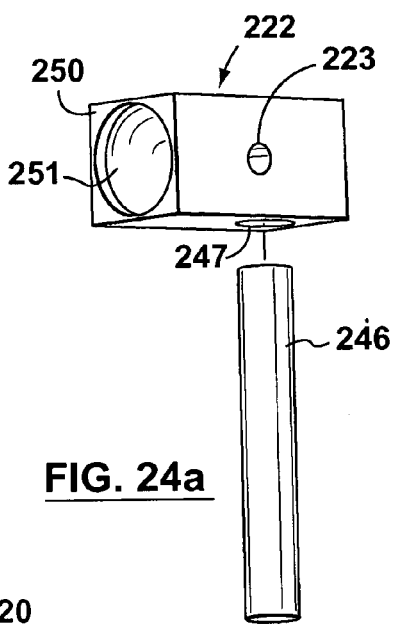
FIGS. 24a and 24b illustrates another embodiment of the mechanical switching mechanism
Figure 24B:
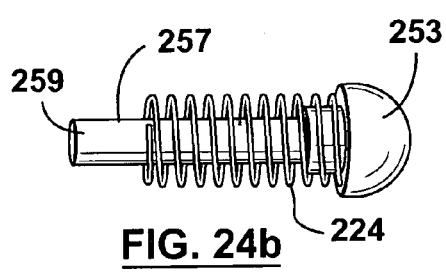
Figure 25:
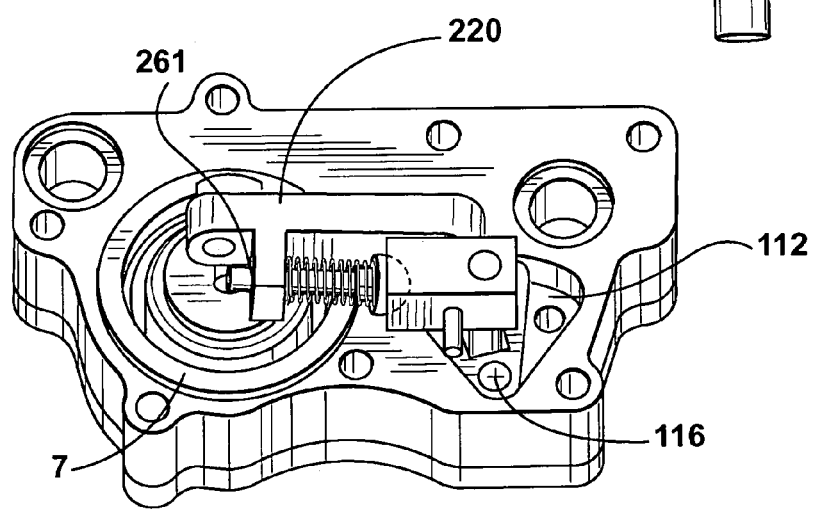
FIG. 25 illustrates the ball and socket embodiment of the invention.

FIGS. 24*a* and 24*b* illustrate another embodiment of the invention where the swing arm 222 has a removeable stem 246 adapted to be received by hole 247. A socket 251 is disposed at another end 250 of swing arm 222. The socket 251 as shown is spherical and adapted to receive ball joint 253 shown in FIG. 24*b*. The ball joint 253 is located at on end of a ball shaft 257. The other end 259 of the ball shaft 257 is received by hole 261 presented by cantilever arm 220. The hole 261 slidingly receives ball shaft 257 during the motions previously described. The spring 224 is received by the ball shaft 257 for improved location and operation as shown. The ball joint will rotate or swivel within socket 251 during the motions described.

Figure 26:
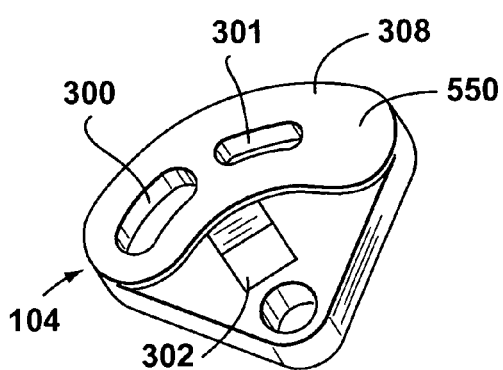
FIG. 26 illustrates another embodiment of the valve
Figure 27:
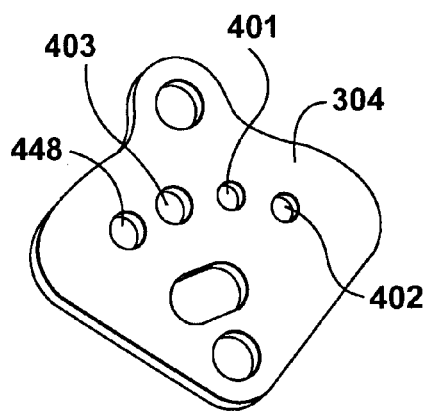
FIG. 27 illustrates a steel plate.

FIGS. 26 and 27 illustrate another embodiment of the invention. Valve 104 includes two kidney shaped couplers 300 and 301 as well as a hole 302 for reception of stem 246. A sealing plate 304 which can be comprised of steel or the like is attached to valve recess 306 shown in FIG. 29 by any number of means such as gluing or the like.

Sealing plate 304 is used to provide a smooth surface for a substantially air tight seal with valve face 308. The holes or ports 401, 402, and 403, and 448 match those of 501, 502, 503, and 548 in valve recess 306.

Figure 28:
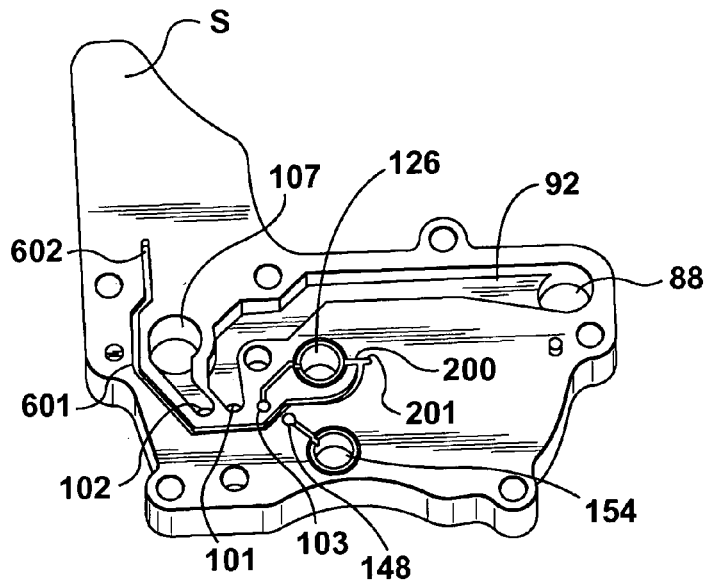
FIGS. 28 and 29 illustrate another embodiment of the intermediate section
Figure 29:
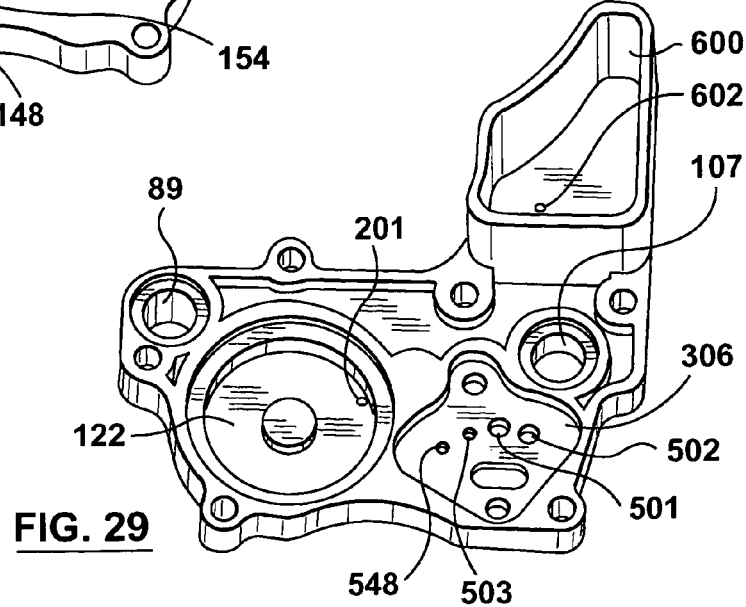
Figure 30:
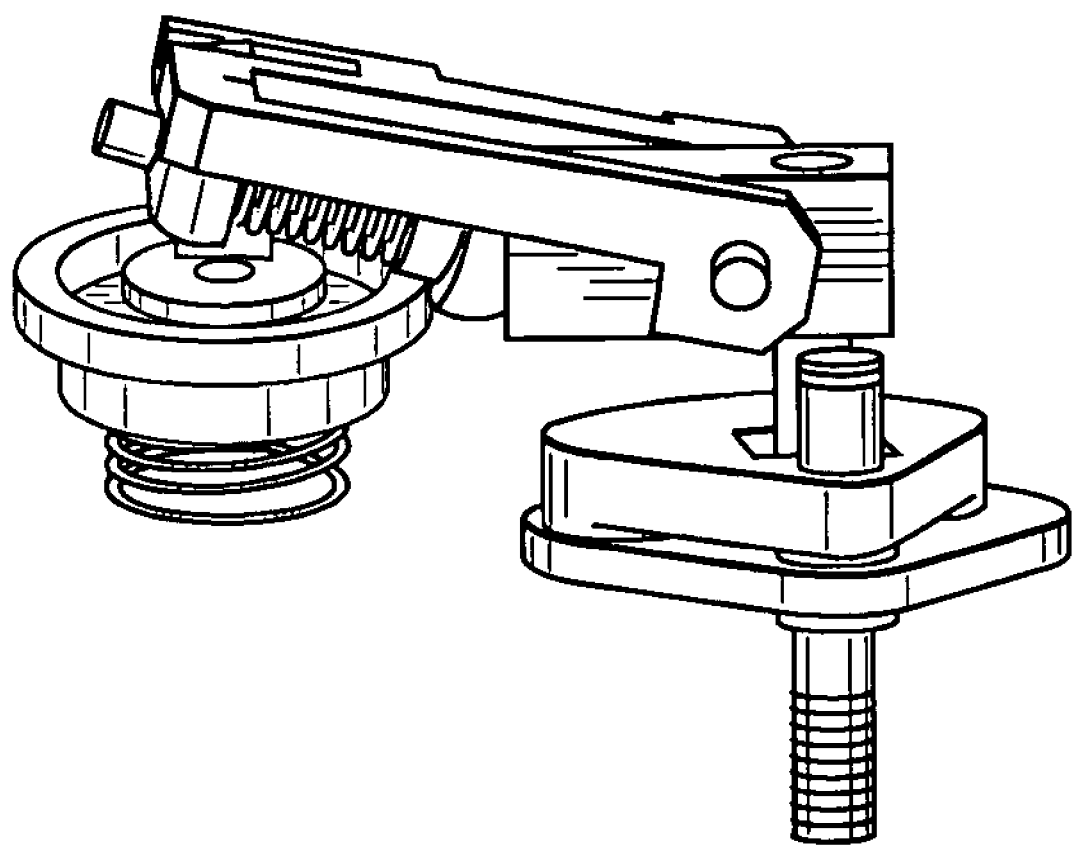
FIG. 30 illustrates another embodiment of the timing mechanism.

FIGS. 28 and 29 illustrates a yet further embodiment of the intermittent module and particularly the intermittent section 86. Intermittent section 86 includes intermittent module port 101, intermittent regulator port 102, diaphragm port 103 and exhaust port 148. An inflate timing needle valve 150 registers in exhaust hole 154 as previously described and opens to atmosphere to control the time that the patient has a vacuum as previously described. The deflate timing timing needle valve 106 is received by receiving hole 128. The deflate timing needle valve 106 controls the time the patient has no vacuum. In one embodiment the inflate timing needle valve 150 and deflate timing needle valve 106 can be adjusted for a 2:1 ratio of vacuum to vacuum off. Other ratios can be selected.

With reference to FIG. 29, when the valve 104 is in the right most position in valve recess 306 coupler 300 covers intermittent regulator port 502 and the space to the right thereof; which blocks or closes intermittent regulator port 502 resulting in no vacuum to the patient. At the same time coupler 301 covers intermittent module port 501 and diaphragm port 503; to allow the supply vacuum to evacuate the air from the diaphragm chamber through the deflate timing needle valve 106 (which controls the timing that the patient does not receive vacuum since the vacuum is being directed to the diaphragm chamber). Also during this time exhaust port 548 is blocked by the extra meat or land 550 on the valve 104 next to coupler 301.

Once the diaphragm chamber is emptied enough of air the switching as described occurs and causes the valve 104 to rotate counter clockwise as viewed in FIG. 29. Now coupler 300 covers intermittent regulator port 502 and intermittent module port 501 providing vacuum from intermittent port 14 to the patient through regulator port 12. Coupler 301 covers exhaust port 548 and diaphragm port 503. Since the inflate timing needle valve 150 is open to atmosphere air enters there through the needle valve and into the diaphragm chamber 122, which begins to fill with air. The cycle starts over.

Moreover the surface S shown in FIG. 28 includes a gasket not shown having the same general configuration as surface S and is adapted to be sandwiched between intermediate section 84 and cover 82 (which will have a similar configuration to surface S) to produce an air-tight seal for passages 92, 200, 107, and 88.

In order to improve the accuracy or precision of timing, a separate chamber 600 can be provided which communicates with the diaphragm chamber 122 by means of channel 601. One end of the channel 601 ports to chamber 600 while another end of channel 601 ports to diaphragm chamber 122 at port 201. In other words the volume of diaphragm chamber 122 is increased by chamber to more accurately control the timing characteristics of the on and off cycle of the intermittent volume. The top of chamber 600 shown in FIG. 29 will in the assembled intermittent module include a top (not shown).

The invention disclosed herein also describes a vacuum regulator having a channel 10 for intermittent vacuum flow, a channel 5 for regulating the level of the vacuum, and an intermittent vacuum module 80 remove securable to the vacuum regulator where the intermittent vacuum module 80 presents:

1. intermittent module port 101 for communicating with the intermittent vacuum channel 10;
2. a module regulator port 102 for communicating with the regulator channel 5;
3. a diaphragm assembly with a diaphragm chamber 122 having a diaphragm port 103;
4. a valve 104 for intermittently connecting
    (i) the intermittent module port 101 to the diaphragm port 103 so as to expose the diaphragm assembly 108 to a vacuum in the first position; and
    (ii) the diaphragm port 103 to the exhaust port 148 to evacuate the vacuum from the diaphragm chamber 122 to ambient in a second position at the same time the intermittent module port 101 is connected to the module regulator port 102 to provide vacuum to the patient
5. a spring loaded swing arm associated with the diaphragm assembly 108 and valve 104 for intermittently displacing the valve 104 when the diaphragm assembly 108 is exposed to the vacuum in the first position and ambient pressure in the second position.

Moreover, the vacuum regulator as shown further includes:

1. a vacuum channel 6
2. a full vacuum output channel 7
3. a selector 28 having
    (a) an intermittent selector port 42
    (b) a full vacuum selector port 40
    (c) a vacuum inlet selector port 26
    (d) a regulator selector port 44
4. a gasket 64 for blocking the full vacuum selector port 41
5. a vacuum dial 28 having a valve coupler 32, 34 for
    (a) coupling the vacuum inlet selector port 27 to the regulator selector port 45 for regulating the vacuum level;

(b) coupling the vacuum inlet selector port 27 to the intermittent selector port 43 for intermittent vacuum; and (c) turning the vacuum off.

Moreover, the invention described herein illustrates the method of producing an intermittent vacuum by moving a valve 104 to the first position to couple a supply of vacuum to the diaphragm chamber 122 having a diaphragm assembly 108 move in response to the vacuum for moving a spring loaded swing arm so as to move the valve 104 to a second position to couple the supply of vacuum to a regulated port and to relieve vacuum from the diaphragm chamber 122 and move the diaphragm in response to said relief for moving the spring loaded swing arm so as to move the valve 104 to the first position.

The ratio of the vacuum on to the off time has been selected at a ratio of 2:1. However, any ratio might be selected and the time duration of the vacuum on versus the vacuum off may be controlled by turning the needle valve 106 as described.

Although the preferred embodiment as well as the operation in use have been specifically described in relation to the drawings, it should be understood that the variations of the preferred embodiment could be achieved by a person skilled in the trade without departing from the spirit of the invention as claimed herein.

I claim:

1. An intermittent pressure module for controlling the position of a valve means between two positions comprising:
   (a) diaphragm means;
   (b) a plurality of ports associated with said diaphragm means for exposing said diaphragm means to a selected pressure in said first position, and another pressure in said second position;
   (c) swing means associated with said diaphragm means and said valve means for intermittently displacing said valve means when said diaphragm means is exposed to said selected pressure in said first position and said other pressure in said second position.

2. An intermittent pressure module as claimed in claim 1 wherein said selected pressure comprises a vacuum, and said other pressure is ambient.

3. An intermittent pressure module as claimed in claim 2 wherein said diaphragm means comprises a diaphragm assembly displaceable between two positions in a diaphragm chamber.

4. An intermittent pressure module as claimed in claim 3 wherein said plurality of ports comprises:
   (a) a port venting to ambient pressure;
   (b) a vacuum port;
   (c) a diaphragm port.

5. An intermittent pressure module as claimed in claim 4 wherein said valve means couples said vacuum port with said diaphragm port for communicating vacuum pressure with said diaphragm chamber so as to draw said diaphragm assembly to said first position.

6. An intermittent pressure module as claimed in claim 5 wherein said valve means couples said vacuum port with said port venting to ambient pressure to evacuate said vacuum from said diaphragm chamber and move said diaphragm to said second position.

7. An intermittent pressure module as claimed in claim 6 wherein said diaphragm assembly is connected to a spring loaded swing arm for moving said valve between said first and second positions.

8. An intermittent pressure module as claimed in claim 7 wherein said intermittent pressure module is connected to a vacuum regulated for delivering intermittent vacuum.

9. A vacuum regulator having:
   (a) an intermittent channel for vacuum flow;
   (b) a regulator channel for regulating a level of vacuum;
   (c) an intermittent vacuum module removably securable to said vacuum regulator, said intermittent vacuum module presenting
      (i) an intermittent port for communicating with said intermittent vacuum channel;
      (ii) a regulator port for communicating with said regulator channel;
      (iii) a diaphragm assembly displaceable within a diaphragm chamber having a diaphragm port;
      (iv) valve means for intermittently connecting
         (1) said intermittent port with said diaphragm port so as to expose the diaphragm assembly to a vacuum in a first position;
         (2) said intermittent port to said regulator port to relieve said vacuum from said diaphragm assembly to ambient pressure and said second position
      (v) swing means associated with said diaphragm assembly and said valve means for intermittently displacing said valve means when said diaphragm assembly is exposed to said vacuum in said first position and ambient pressure in said second position.

10. A vacuum regulator as claimed in claim 9 wherein said vacuum regulator further includes
    (a) a vacuum channel;
    (b) a full vacuum output channel;
    (c) a selector having:
       (i) an intermittent selector port
       (ii) full vacuum selector port
       (iii) a vacuum inlet selector port
       (iv) regulator selector port
    (d) a gasket for blocking said full vacuum selector port;
    (e) a valve coupler presented by said valve means for:
       (i) coupling said valve inlet selector port to said regulator selector port for regulating said vacuum level;
       (ii) coupling said vacuum inlet selector port to said intermittent selector port for intermittent vacuum;
       (iii) turning off said vacuum.

11. A vacuum regulator as claimed in claim 10 wherein said intermittent module is removable and said gasket is replaceable for disabling intermittent vacuum and permitting full vacuum delivery.

12. A vacuum regulator as claimed in claim 11 wherein said intermittent module includes an adjustable needle valve for controlling the rate of flow of air into and out of said diaphragm chamber.

13. A vacuum regulator as claimed in claim 12 wherein said diaphragm assembly includes:
    (a) a rolling diaphragm;
    (b) spring means disposed between said diaphragm and said diaphragm chamber.

14. A vacuum regulator as claimed in claim 13 wherein said swing means comprises a spring loaded swing arm connected at one end to said rolling diaphragm and at another end to said valve means.

15. A vacuum regulator as claimed in claim 14 wherein said valve means includes a pivot point at one end and a plurality of cups at another end.

16. A method of producing an intermittent vacuum by moving a valve to a first position to couple a supply of vacuum to a diaphragm chamber having a diaphragm move in response to said vacuum for moving a spring loaded spring arm so as to move said valve to a second position to couple said supply of vacuum to a regulated port so as to relieve said vacuum from said diaphragm chamber and move said diaphragm in response to said relief for moving said spring loaded spring arm and move said valve to said first position, repeatedly.

17. A method as claimed in claim 16 wherein said intermittent vacuum is delivered in a ratio of 2:1.

18. A method as claimed in claim 17 wherein said spring-loaded spring arm is stable in said first and second positions.

19. A method as claimed in claim 18 wherein said time duration of said intermittent vacuum flow is controllable by an adjustable needle control valve.

20. A method as claimed in claim 19 wherein said intermittent vacuum is delivered to a vacuum regulator.

* * * * *